US000001890H

United States Statutory Invention Registration [19]

[11] Reg. Number: H1,890

[45] Published: Oct. 3, 2000

Parr et al.

[54] INDIRECT MODULATION METHOD FOR ACTIVITY CONTROLLED WASTE INCINERATOR AFTERBURNER

[75] Inventors: Timothy P. Parr; Klaus Schadow; Kenneth J. Wilson; Robert A. Smith; Kenneth Yu, all of Ridgecrest, Calif.

[73] Assignee: The United States of America as represented by the Secretary of the Navy, Washington, D.C.

[21] Appl. No.: 09/226,615

[22] Filed: Dec. 22, 1998

Related U.S. Application Data

[62] Division of application No. 08/982,134, Dec. 1, 1997.

[51] Int. Cl.[7] ..... F23C 11/04

[52] U.S. Cl. ..... 431/1; 431/9; 60/39.76; 60/749; 110/342

*Primary Examiner*—Harold J. Tudor

*Attorney, Agent, or Firm*—Gregory M. Bokar; David S. Kalmbaugh

[57] ABSTRACT

This invention involves an improved technique for the modulation of waste in an actively controlled compact waste incinerator afterburner. This improved technique utilizes acoustic driving to affect indirect modulation of waste flow velocities. The waste surrogate gases are modulated indirectly by periodic entrainment created by the roll-up of the main air vortex as well as indirect acoustic excitation of secondary air injection. One of the main advantages of this new configuration is the acoustic drivers used to phase inject the waste into the vortex for proper combustion are not in direct contact with the hot waste and therefore can be less expensive and more durable over the long term.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INDIRECT MODULATION METHOD FOR ACTIVITY CONTROLLED WASTE INCINERATOR AFTERBURNER

CROSS-REFERENCE TO RELATED APPLICATION

This application is being filed as a Divisional application in accordance with 37 C.F.R. 1.53(b). The Parent application of this Divisional is application Ser. No. 08/982,134 filed Dec. 1, 1997.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

Information contained in this section is provided in more detail in U.S. Pat. No. 5,361,710. A brief overview of this technology follows in the section below.

1. Field of the Invention

The present invention relates to incinerators and to a method and apparatus for the active control of compact waste incinerators. More particularly, the invention described herein is an improved technique for the modulation of waste in an actively controlled compact waste incinerator afterburner.

2. Description of the Prior Art

The interaction between turbulent mixing processes and combustion is important in many practical applications such as air-breathing propulsion systems, energy conversion power plants, hazardous waste incinerators and other chemical reactors and industrial processes. Studies of turbulent mixing during the last two decades established the role of organized coherent large-scale vortical structures in the mass and momentum transfer across the shear layer between two fluids in motion. (Please refer to the following papers for a more detailed discussion on this topic: S. C. Crow and F. H. Champagne, "Orderly Structure in Jet Turbulence", J. Fluid Mech., 48, pp. 545–591, 1971. G. L. Brown, and A. Roshko, "On Density Effects and Large Structure in Turbulent Mixing Layers", J. Fluid Mech., 64, pp. 775–816, 1974. C. M. Ho, and P. Huerre, Ann. Rev. Fluid Mech., 16, pp. 365–424, 1984.).

It was further determined that by manipulating these structures it is possible to alter the mixing process. Active control methods were devised to enhance the spreading rate of the shear layer by mechanical or acoustic excitation of the initial shear layer, and thus accelerate the mixing between the two streams. (Please refer to the following papers for a more detailed discussion on this topic: D. Oster, and I. J. Wygnanski, "The Forced Mixing Layer Between Parallel Streams", Fluid Mech., 123, pp. 91–130, 1982. C. M. Ho, and L. S. Huang, "Subharmonics and Vortex Merging in Mixing Layers", J. Fluid Mech., 119, pp. 443–473, 1982.)

The understanding of the mechanism governing turbulent mixing and their control was extended to turbulent combustion. New laser based diagnostic techniques (R. K. Hanson, "Combustion Diagnostics: Planar Imaging Techniques", 21st Int. Symp. on Combustion, pp. 1677–1691. Pittsburgh: The Combustion Institute, 1986.) with high temporal and spatial resolution, which yield species-specific two and three dimensional maps of the combustion region, accelerated the process; the important role of controlling the large and small scale mixing on the combustion process was determined. (E. J. Gutmark, T. P. Parr, D. M. Hanson-Parr, and K. C. Schadow, "On the Role of Large and Small-Scale Structures in Combustion Control", Combustion Science and Technology, 66, pp. 107–126, 1989.). Initial studies of combustion control focused on the problem of combustion instabilities. The numerous studies on the application of active control to suppress combustion instabilities were reviewed recently by Candel (S. Candel, 24th Int. Symp. On Combustion. Pittsburgh: The Combustion Institute, 1992.) and McManus et al. (K. R. McManus, T. Poinsot, and S. Candel, "A Review of Active Control of Combustion Instabilities", Progress in Energy and Combustion Science, 19, pp. 1–29, 1993.). Active control by shear layer excitation was applied to enhance energy release (Please refer to the following papers for a more detailed explanation on this topic: K. R. McManus, U. Vandsburger, and C. T. Bowman, "Combustor Performance Enhancement through Direct Shear Layer Excitation", Combustion and Flame, 82, pp. 75–92, 1990. K. Yu, A. Trouve, and S. Candel, "Combustion Enhancement of a Premixed Flame by Acoustic Forcing with Emphasis on the Role of Large Scale Vortical Structures", AIAA Paper No. 91-0367, 1991. E. J. Gutmark, K. J. Wilson, K. C. Schadow, B. E. Parker, R. L. Barron, G. C. and Smith, "Dump Combustor Control Using Polynomial Neural Networks (PNN)", 31$^{st}$ AIAA Aerospace Sciences Meeting, Reno, Nev., AIAA Paper No. 93-0117, 1993. K. T. Padmanabhan, C. T. Bowman, J. D. Powell, "An Adaptive Optimal Combustion Control Strategy", 25th Int. Symp. on Combustion, Pittsburgh: The Combustion Institute, 1994.) and to mitigate the production of pollutants (Chen, V. G. McDonell, and G. S. Samuelson, WSS/CI Fall Meeting, Paper No. 92-75, 1992.). Fluid dynamic control has also been applied to hazardous waste incineration (O. I. Smith et. al., "Incineration of Surrogate Wastes in a Low Speed Dump Combustor", Comb. Sci. and Tech. 74, 199 (1990). R. Marchant et. al. "Development of a Two-Dimensional Dump Combustor for the Incineration of Hazardous Wastes", Comb. Sci. and Tech. 82, 1 (1992).).

Incinerator technology relies on a number of factors including combustion temperatures, fuel and waste residence time and the fine scale mixing of the fuel, waste and an oxidizer. Incineration technology includes rotary kilns, fixed and multiple hearth incineration devices, fluidized bed incinerators and liquid injection incinerators. These devices are usually large-scale devices which rely on high heat capacity and long residence time to achieve the required destruction capacity which most incinerators need to operate. These types of devices are able to achieve high residence times and heat capacities by utilizing a very large combustion chamber. Long residence times and high heat capacities result in high operational costs as well as unacceptable emissions when the incinerator is forced to operate outside its optimum design conditions.

Compact incinerators can achieve the required destruction capacity in a small-scale device, with much shorter incineration time and higher combustion efficiency. Compact incinerators are valuable because they eliminate the need to transport waste from remote locations to a central facility and because they can be installed on ships at a minimum of space penalty.

In order to maintain reliable and efficient operation compact incinerators require a highly optimized and effectively controlled combustion process. Achieving increased thermal destruction efficiency while maintaining a minimal amount of particulate and gaseous pollutant emissions is the ultimate goal in designing a compact incinerator unit. There exists a continuing need for a reliable and inexpensive method of controlling the combustion process in order to improve the overall performance of the combustor. Optimally, a compact incinerator will have a very high efficiency and very low emissions.

The combustion characteristics of an enclosed combustor are closely related to the interaction between shear flow dynamics, of the fuel and air flow at the inlet and acoustic modes of the combustor. The airflow dynamics may lead to highly unstable combustion. Unstable combustion may occur when the acoustic modes of the combustor match the instability modes of the incoming airflow. The shedding of the airflow vortices upstream of the combustion chamber tends to excite acoustic resonances in the combustion chamber, which subsequently causes the shedding of more coherent energetic vortices. The presence of such vortices provides a substantial contribution to the overall efficiency of the combustion process.

Historically, passive combustion control was the norm. For example, in the dump combustor, nonstandard inlet duct cross-sections were used to control the generation and breakdown of large-scale vortices. These vortices play a critical role in driving pressure oscillations and determining flammability limits. Passive control has also been achieved by utilizing bluff-body flame holders at the downstream facing step into a dump combustor.

Recently, active combustion control has received more and more attention. In active combustor control various control devices such as actuators are used to modify the pressure field in the system and to regulate the air or fuel supply. Active control devices which have been used in laboratory experiments include loudspeakers to modify the pressure field of the system or to obtain fuel flow regulation, pulsed gas jets aligned across a rearward facing step, adjustable inlets for time-variant change of the inlet area of the combustor and solenoid-type fuel injectors for controlled addition of secondary fuel into the main combustion zone. These active control devices have been successful in suppressing pressure oscillations and extending flammability limits when the combustor operates at low heat release rates. The existing trend in active control techniques for a combustor is towards decreasing performance of the controller with increasing energy levels within the combustor.

BRIEF SUMMARY OF THE INVENTION

This invention involves an improved technique for the modulation of waste in an actively controlled compact waste incinerator afterburner. This improved technique utilizes acoustic driving to affect indirect modulation of waste flow velocities. This invention involves the introduction and modulation of the waste flow velocities and is an extension to U.S. Pat. No. 5,361,710. In Pat No. 5,361,710, acoustic drivers modulate the waste surrogate injection directly. In this invention the waste surrogate gases are modulated indirectly by periodic entrainment created by the roll-up of the main air vortex as well as indirect acoustic excitation of secondary air injection. In both cases, the phase angle is controlled such that the combustibles are introduced into the air vortex at the right time during the vortex formation resulting in good mixing, a controlled yet lifted partially premixed flame, high waste destruction efficiency, and low pollutant emissions. One of the advantages of this new configuration compared to U.S. Pat. No. 5,361,710 is that the acoustic drivers used to phase inject the waste into the vortex for proper combustion are not in direct contact with the hot waste and therefore will last much longer.

In this invention, the work on active combustion control included open and closed loop control of small scale-(~10 kW) and large scale-(~1 MW) combustors to enhance their performance by increasing energy release, extending the lean flammability limit, and stabilizing the combustion. The common underlying concept of the combustion processes is vortex combustion. In practical combustors, the combustion process occurs at different locations within the combustion chamber depending on the air/fuel mixture and the fluid dynamic and thermodynamic conditions. Even if the average conditions are proper, it is common that the local conditions are not right for efficient combustion. The vortex combustion technique ensures that the combustion is confined to regions (i.e., vortices) within the combustor where optimal local conditions can be maintained. The vortex provides intense mixing and long residence time necessary for a complete combustion process. It also ensures localized high temperature to maintain efficient combustion. The fuel injection system can be designed for optimal utilization of the fuel by placing the fuel at the regions which provide the best conditions for its combustion. An object of the invention is to utilize liquid fuel injection into air vortices and its use for gaseous and liquid waste incineration.

DETAILED DESCRIPTION OF THE INVENTION

Figure 1:
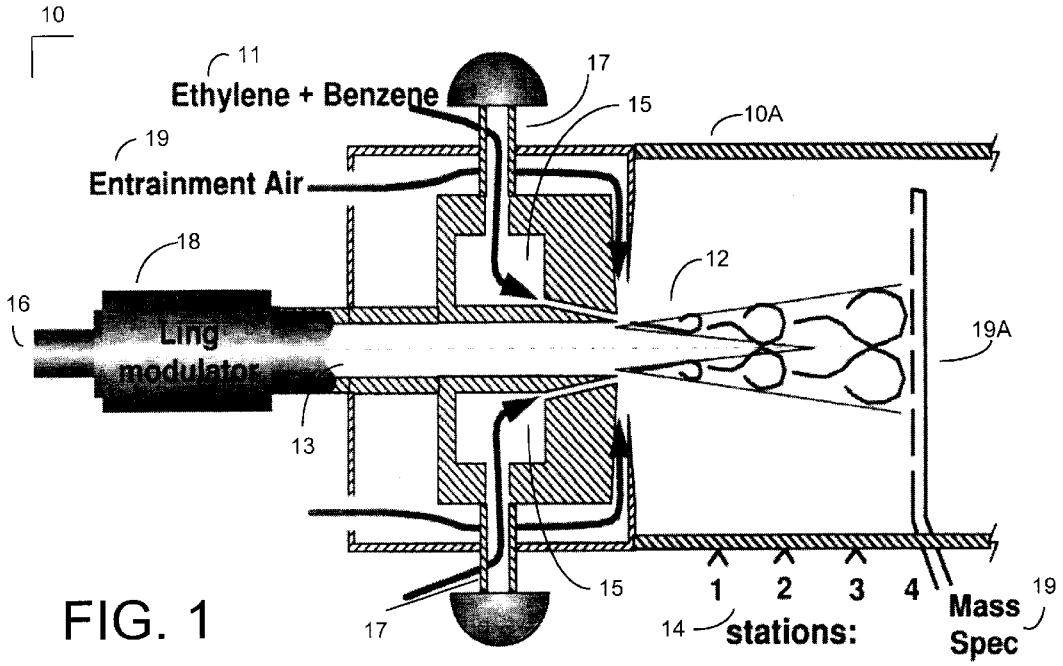
FIG. 1 is a schematic diagram in profile of the Gas Burner configuration of an actively controlled dump combustor incinerator in accordance with a preferred embodiment of the present invention.
Figure 2:
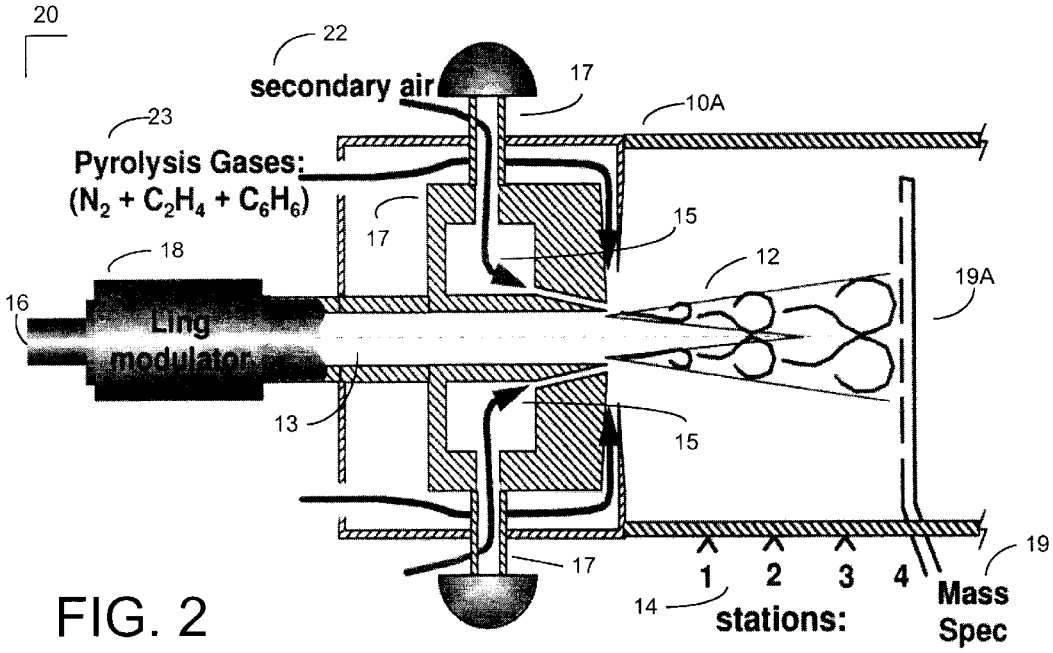
FIG. 2 is a schematic diagram in profile of the After Burner configuration of an actively controlled dump combustor incinerator in accordance with a preferred embodiment of the present invention.

As discussed earlier, this invention comprises an improved technique for the modulation of waste in an actively controlled compact waste incinerator 10. This invention utilizes acoustic driving to affect indirect modulation of waste flow velocities. Waste surrogate gases 11 are modulated indirectly by periodic entrainment created by the roll-up of the main air vortex, as well as indirect acoustic excitation of secondary air injection 22. In both cases, the phase angle is controlled such that the combustibles are introduced into the air vortex 12 at the proper time during the vortex formation resulting in good mixing, a controlled yet lifted partially premixed flame, high waste destruction efficiency, and low pollutant emissions. As discussed, the advantage in this new configuration is that the acoustic drivers 14 used to phase inject the waste into the vortex 12 for proper combustion are not in direct contact with the hot waste.

Active control of fluid dynamics has been used to enhance mixing in incinerator afterburner experiments and increase the DRE for a waste surrogate. Experiments were conducted in a 50 kW scale burner in two configurations: one with direct modulation of the fuel and waste, gaseous burner (GB) 10, and another with indirect modulation of starved air pyrolysis surrogate, afterburner (AB) 20.

The open loop active control system is based on the concept of combustion in periodic axisymmetric vortices. Acoustic excitation was used to stabilize coherent vortices in the central air flow 13 of a dump combustor like configuration. The fuel and waste are injected annularly at the dump 15. In the GB configuration 20, acoustic drivers 14 modulate the fuel injection directly. In the AB configuration 10, the pyrolysis surrogate 23 is modulated indirectly by periodic entrainment created by roll-up of the main air vortex 12, as well as acoustic excitation of secondary air 22 injection. In both cases the phase angle is controlled such that the combustibles are introduced into the air vortex 12 at the optimal time during the vortex formation. This leads to good mixing, a controlled yet lifted partially premixed flame, high DRE and low emissions.

The concept was previously tested at the 4.5 kW level and was proven to be effective in reducing soot formation in propane, ethylene, acetylene, and benzene fueled flames. It was also shown to greatly improve waste destruction. Scale-up and optimization of this control concept to the 50 kW level were analyzed. It was found that a gaseous fueled actively controlled 50 kW incinerator simulator, designed on the same fluid dynamic principles as the 4.5 kW device, was able to surpass 99.999% destruction and removal efficiency (DRE) even when a waste surrogate such as gaseous benzene constituted 17% of the total fuel content. This was with a combustible to total air ratio Φ (fuel to air ratio/stoichiometric ratio) =0.78. The GB configuration 10 exceeded 6500 kW/m$^3$ for 99.99% DRE of benzene. Emissions were seen to be high at Φ=0.78 so the stoichiometry was reduced to 0.57. Under these conditions the controller also reduced emissions. CO emissions dropped from 2900 ppm without control to as low as 2 ppm with control. Unburned hydrocarbons were also reduced significantly. $NO_x$ was reduced by less extreme ratios, reductions of 3 to 5 were observed and absolute levels under active control were down to 12 ppm. Parameters found critical to maintenance of high DRE in the GB tests were the forcing level of the fuel injection, the fraction of circumferentially entrained air, and the phasing angle of fuel injection with respect to the air vortex roll-up.

In the AB configuration 20 the geometry of the waste entrainment and the forcing level of the central air vortex 12 were paramount, with the secondary air 22 level and forcing intensity of secondary importance. The controller was still effective and DREs beyond 5 were easily attainable at x/D of 3.0 and the system exceeded 4 nines at x/D =2.07. The controller also significantly reduced CO and UHC, and $NO_x$. Acoustic design of the combustor was also important and the DRE was higher, the flame more compact, and the emissions lower if an acoustic resonance of the combustor was excited and if this frequency were near the preferred mode of the central air jet. The acoustic design minimized mode beating and increased coherency.

Benzene, which is third on the EPA list of thermally stable, difficult to destroy hazardous compounds (as reported by C. C. Lee, G. L. Huffinan, and S. M. Sasseville, "Incinerability Ranking Systems for RCRA Hazardous Constituents", Hazardous Waste and Hazardous Materials, Vol. 7, (1990)) was selected to be introduced into the system to determine its capabilities. Gaseous benzene was introduced into the gaseous burner (GB) 10 or afterburner (AB) 20 systems by bubbling flow through a bottle of liquid benzene in a temperature controlled water bath. The fuel was ethylene and the pyrolysis surrogate 23 was a mixture of nitrogen, ethylene, and benzene at 62%, 31%, and 7% by weight, respectively. The benzene constituted about 10 to 17% of the combustible content.

The larger scale incinerator 10 (FIG. 1), a direct scaleup of the 4.5 kW laboratory unit, was gaseous fueled and generated 47–70 kW of heat release. The inlet 16 diameter was 38.4 mm and the dump 17 178 mm. The velocity of the inlet jet was 10.3 to 15.3 m/s for a Reynolds number of 26,000 to 39,000 based on the jet diameter. The measured preferred mode of the jet at 15 m/s was 190 Hz. The inlet flow was forced using a high speed acoustic valve ("LING ELECTRONICS™") 10, and despite the order of magnitude increase in flow rate over the laboratory combustor, and nearly an order of magnitude increase in Reynolds number, it was easy to generate coherent vortices using less than 5 Watts, as shown by Mie scattering flow visualization. The acoustical output power of the "LING™" valve 18 increases sharply with increasing flow rate, even at constant electrical power input, so much larger incinerators could be controlled with similarly modestly powered controllers.

In the GB 10 tests the gaseous fuel and benzene 11 were introduced circumferentially through 38 holes 15 of 2.3 mm diameter fed from an acoustically forced plenum as in the smaller scale incinerator. The plenum is forced with four 75 Watt acoustic compression drivers 14 . Extra "entrainment" air 19 was introduced circumferentially, and at right angles to the central air flow, via an entrainment plate (not shown).

In the AB configuration 20 the entrainment region had a mixture 23 of nitrogen, ethylene, and benzene, to simulate the output of a primary pyrolysis chamber such as a kiln or plasma unit. In this configuration what were the "fuel" jets in the GB configuration 10 were supplied with secondary air instead, and no co-fuel 23 was used. This flow was still acoustically forced, however. The main difference between the GB 10 and AB 20 configurations is that the combustibles are directly modulated by speaker drivers (not shown) in the GB configuration 10. If these combustibles were the fuel rich pyrolysis output of a primary chamber, however, they would be hot and the speaker drivers may not be able to survive. This prompted the AB configuration 20 studies where the speakers are not subjected to what would be hot gas.

The remaining benzene in the exhaust was monitored with an on-line mass spectrometer 19 tuned to m/e=78. The probe (not shown) was water cooled and several orifices averaged over the radial profile of the exit 19A. The destruction and removal efficiency (DRE) was calculated from the benzene concentration remaining in the exhaust: DRE(%)=100×[1−(benzene out/benzene in)]. DREs are also often quoted as "nines" where 99.99% DRE corresponds to 4 nines and DRE(nines)=$-\log_{10}$(1−DRE(%)/100)). The sensitivity limit of the on line mass spectrometer 19 corresponds to DREs of about 5 nines, depending on the amount of waste loading. This sensitivity was obtained by averaging over about 2 minutes per condition. It should be noted that a mass scan from 50 to 200 amu detected nothing but benzene when the DRE was low and nothing at all when the DRE was high. Thus, even though subsequent tests were done monitoring only the mass of benzene, the results are valid as the benzene is not merely being converted to some other hazardous compound.

Another identical water cooled probe (not shown) was directly attached to a continuous emission monitor (not shown) which measured $O_2$, $CO_2$ (calculated), CO, NO, and $NO_2$. Each probe could be placed at one of four locations (not shown) within the 610 mm long combustor so that measurements could be made at various downstream x/D distances (where x is the downstream mm and D is the dump 17 diameter). Both probes were mounted vertically to minimize sampling error caused by buoyancy, i.e. the multiple orifices of the probes averaged over a vertical radial profile across the duct 10A.

Figure 3:
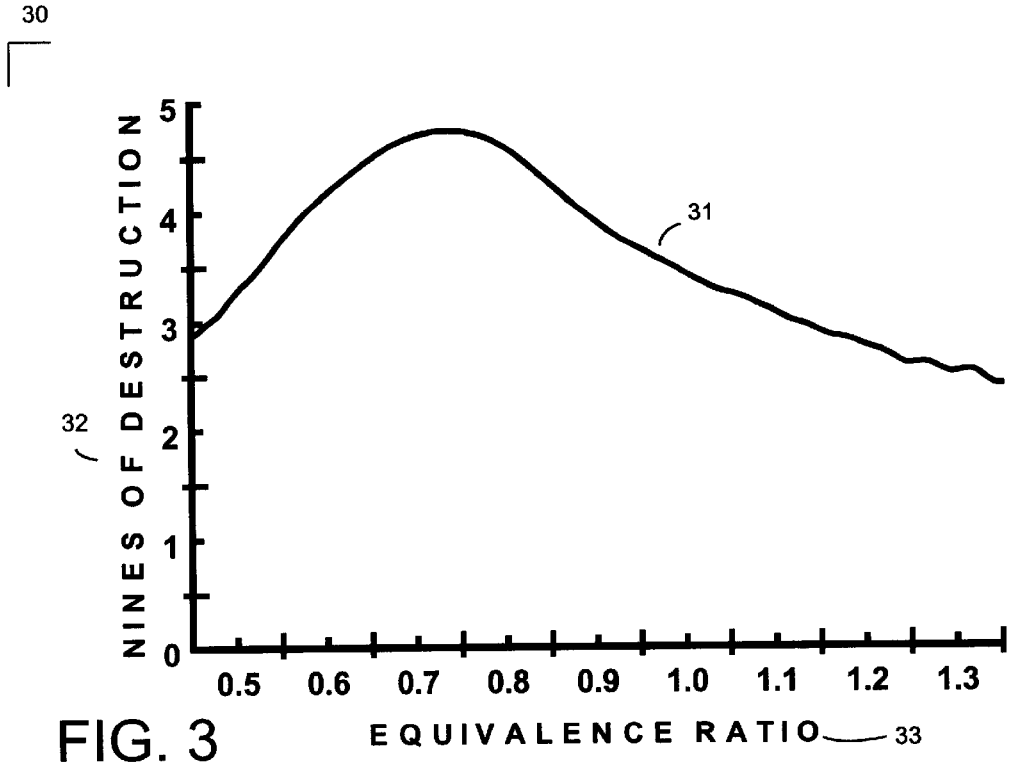
FIG. 3 is a graph of Benzene destruction and removal efficiency (DRE), plotted in "nines," e.g., three "nines" is 0.999 efficient in removal, in Gas Burner (GB) tests as a function of total stoichiometry, plotted as an equivalence ratio.

Results of experiments using a small laboratory scale incinerator (not shown) were applied at the larger scale with over an order of magnitude scale up of flow rate and energy release. The laboratory experiments at 4.5 kW were done near an overall Φ (fuel to air ratio/stoichiometric ratio) of 1.0, and were finished before acquisition of the continuous emission monitor (CEM). Initial experiments in the GB configuration 10 showed that the DRE optimized at a Φ near 0.8, possibly due to less than perfect mixing that might be associated with lower coherency from the much higher Reynolds number. This is illustrated 30 in FIG. 3 for GB 10 tests as a function 31 of Benzene DRE, plotted in "nines"32, versus total stoichiometry, plotted as equivalence ratio 33.

Figure 4:
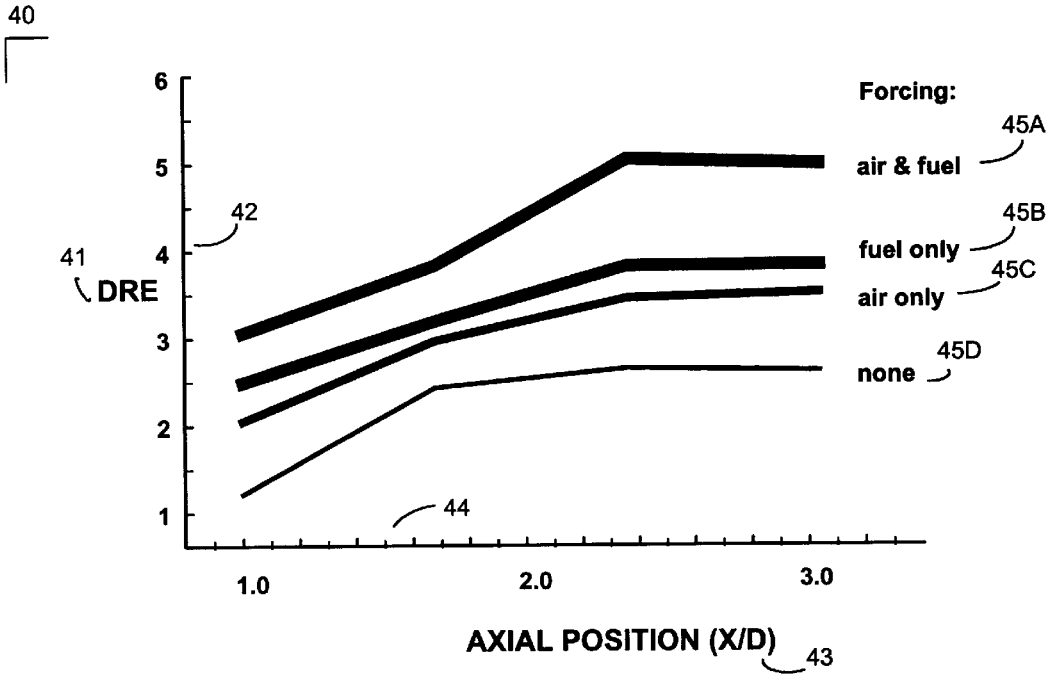
FIG. 4 is a graph of Benzene DRE, plotted in nines, in Gas Burner (GB) tests for various conditions of the controller as a function of axial position, x/D, where x is the axial distance downstream from the dump and D is the diameter of the dump.

FIG. 4 illustrates 40 that the benzene DRE 41 exceeded the EPA limit of 99.99% (4 nines) 42 at an x/D 43 of only 1.7 44. FIG. 4 compares Benzene DRE 41, plotted in nines, as a function of axial position, x/D 43, where x is the axial distance downstream from the dump 17 and D is the dump 17 diameter for various conditions 45 A–D of the GB 10 controller. The top curve 45A depicts results obtained with optimization of the controller; the next curve 45B depicts results obtained forcing the fuel jets (not shown) only; the third curve 45C depicts results obtained forcing air only; and the bottom curve 45D depicts results obtained for no forcing. This corresponds to a power density of 6500 kW/m$^3$.

Figure 5:
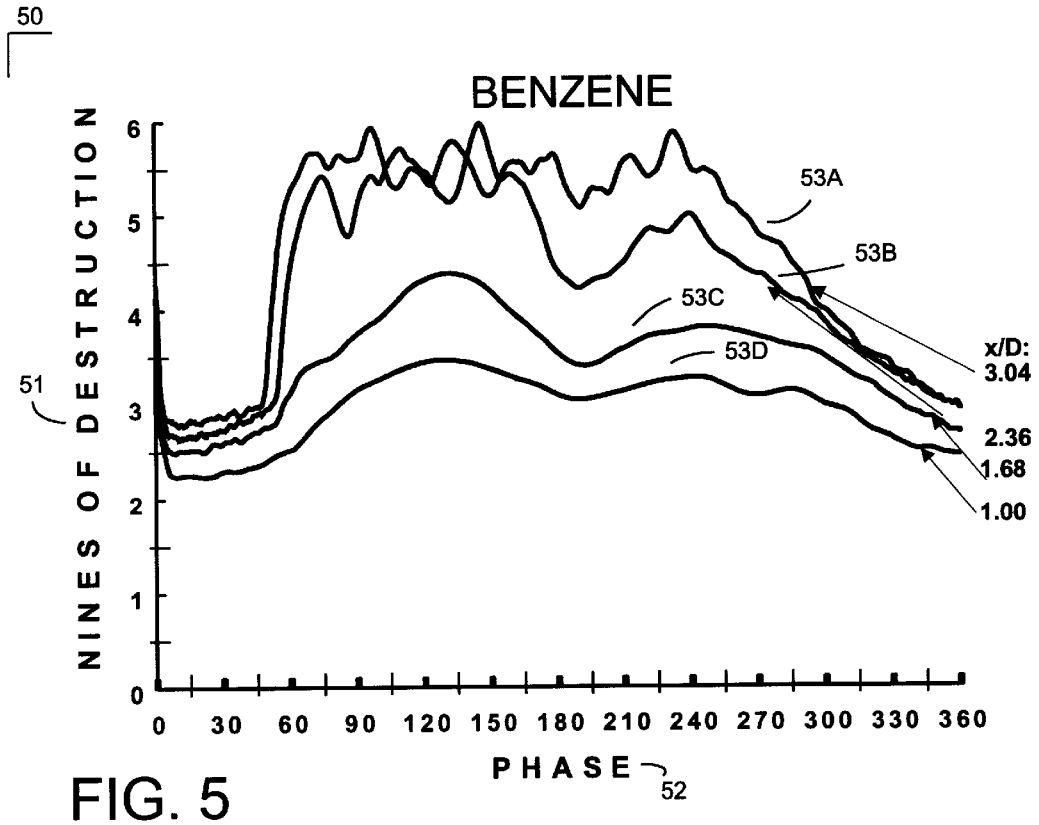
FIG. 5 is a graph of Benzene DRE, plotted in nines, in Gas Burner (GB) tests as a function of relative phase angle, plotted in degrees, between the central air vortex roll-up cycle and the fuel/waste injection at various x/D locations.

The most important parameter for these tests was the forcing level for the fuel jets. When the air vortex is forced, the DRE is considerably higher and the phase angle between vortex 12 roll-up and fuel injection becomes important as it was in the laboratory tests. This is illustrated 50 in FIG. 5, where Benzene DRE 51 is plotted as nines against phase angle 52, plotted in degrees, between the central air vortex 12 roll-up cycle and the fuel/waste injection at various axial positions, x/D 53 A-D.

These tests were done with a central air speed of 10.3 m/s and a forcing frequency of 120 Hz for a Strouhal number of 0.41. Both the central air and the fuel were forced at the same frequency (but not the same phase). The power was 47 kW. Subsequent tests were done at 15.3 m/s to get the frequency of the preferred mode of the jet (not shown) up to match an apparent resonance in the combustor 10 of about 190 Hz. This brought the power to 70 kW.

Measurements with the CEM (not shown) showed that while the DRE for benzene was beyond 4 nines at x/D=1.7, the emissions were unacceptably high. At the position of x/D=1.7 the CO was as high as 10,000 ppm and the unburned hydrocarbons (UHC) were also quite high. Based on these results, there was incomplete combustion despite the high DRE for benzene. Backing off on the Φ down to 0.6 from 0.8 caused similar results in the DRE, but the CO dropped to very low levels. At the exit 19A (x/D=3) the CO was as low as 2 ppm, the UHC below the detection limit of 0.01%, and $NO_x$ about 20 ppm. The unforced combustor produced 2900 ppm CO, 0.19% UHC, and 65 ppm $NO_x$ at the same position. This indicates that the controller not only increases benzene DRE and improves combustion efficiency, it also manages to reduce $NO_x$ as well. In fact, changing the relative phase angle between fuel injection and vortex roll-up produces the same sine wave in CO and UHC (inverted) as it does in DRE. These results indicate that the mechanisms that improve DRE also decrease CO and UHC. With the controller off the flame is long and sooty. With the controller on, the flame moves upstream, and is entirely blue.

The drop in the Φ brought the power back down to 49 kW despite the higher flow rate. The optimum fraction of secondary (entrainment) air 22 in these experiments was 18% of the total air flow. The acoustic levels were quite high when the controller was operating. These results are probably due to the modulation of the fuel into the vortices 12 which creates periodic heat release, leading to acoustic energy, which then feeds back to enhance the coherence of the air vortex shedding process. There were complex interactions between the inlet mode, the combustor mode, and the preferred mode of the jet. Both the combustor 10 and the inlet 13 had resonances near 170 to 190 Hz and these changed as the temperature of the inlet air or combustor 10 changed. The near equality of the resonances lead to undesirable beating in the acoustic intensity in the combustor 10. For example, the pressure oscillations would, for short periods of time, periodically drop to near zero. The beat was random but approximately a few Hertz. This is most certainly detrimental to the operation of the controller because it would indicate there are intermittent periods of poor mixing and possible escape of benzene or production of burps of emission. Therefore, all subsequent tests were done with the LING™ modulator valve 18 close coupled to the dump 17 combustor to place the inlet mode frequency out of the range of importance. The modulator (not shown) was still easily able to generate coherent vortices and the acoustic modes were much simpler and more controllable. The acoustics in the chamber were also much more steady and the beating essentially entirely gone.

The combustor mode exists due to a 46% area blockage at the exit 19A by the mounting structure creating a "nozzle" (not shown) at the exit 19A. Variation of the length of the throat of this "nozzle" leads to changes in the combustor acoustic resonance frequency. These relative changes appeared to closely track the formula for a bulk mode oscillation. In fact, when the nozzle throat length was increased, the unforced system showed a clear peak in the acoustic noise level in the chamber. Bringing the forcing frequency near this peak caused an onset instability during which all the energy collapsed into a very coherent peak. If the forcing level were then dropped, the system would continue to self oscillate at a high level for quite some time. Under certain conditions, the acoustic level inside the combustor 20 can reach 1 PSI peak to peak.

In the afterburner configuration 20 the combustibles are not directly modulated. Initial tests were conducted with the exact same geometry of the GB 10 system with secondary air entering through the "fuel" jets (not shown) and the nitrogen-ethylene-benzene mixture 23 entering what was the entrainment air 19 in the GB 0 system. Results indicated that the geometry was not optimized for the AB 20 operation. An extensive variation of the entrainment geometry was undertaken with the radius and velocity being varied and the performance evaluated by measuring the CO, UHC, and $NO_x$. In the best configuration, the pyrolysis surrogate 23 was introduced much closer to the shear layer (not shown) and the gap (not shown) was reduced so it entered at a higher velocity (5 m/s vs. 1.8 m/s). With this geometry the entrainment plate partially covered the secondary air jets (not shown) (which are modulated acoustically using the same plenum used for the fuel in the GB 10 tests). This closer coupling enhances both the injection of the pyrolysis surrogate gases 23 into the shear layer as well as increasing the modulation level caused by the secondary air jets.

Figure 6:
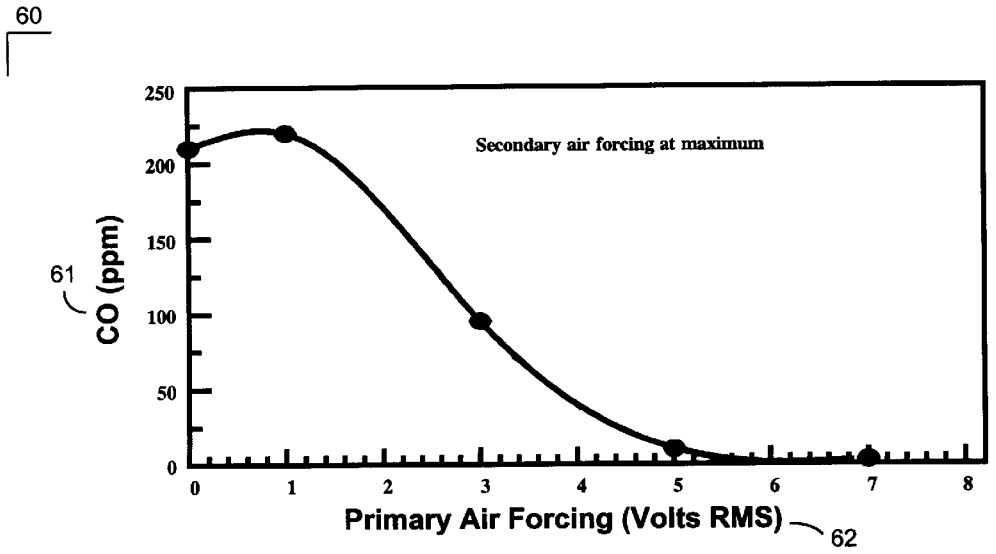
FIG. 6 is a graph of carbon monoxide (CO) P DRE, plotted in parts per million (ppm), in After Burner (AB) tests as a function of primary air forcing, plotted in volt rms ($V_{rms}$).

In this configuration, the amount of secondary air 22 flow was not of much importance and the CO was essentially as low for no secondary air 22 flow as for values up to 20%. It should be noted that even with no secondary air flow the plenum (not shown) is still forced acoustically. However, the forcing on the central air 13 flow becomes the primary controlling factor in this configuration. Much larger drops in CO are obtained when the primary air 13 forcing is increased than when the secondary 22 is changed. FIG. 6 illustrates 60 the drop in CO 61, plotted in parts per million (ppm), as the primary air 13 forcing 62, plotted as voltage of the Ling™ valve 18, $V_{ling}$, in $V_{mis}$ is turned up (with the secondary 22 air forcing at maximum).

Figure 7:
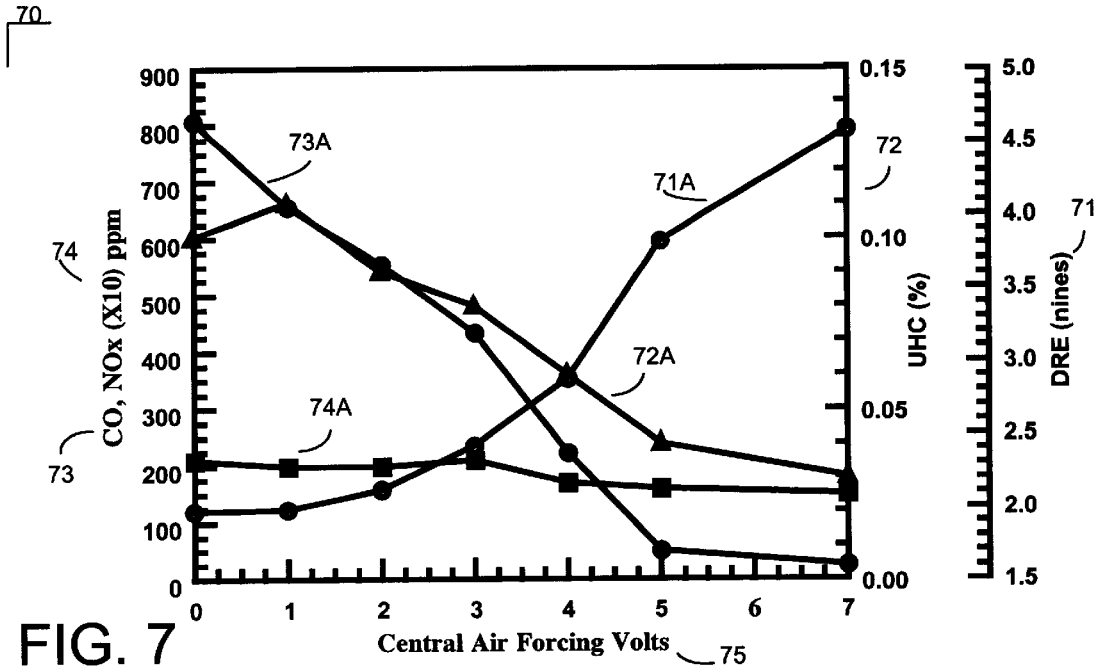
FIG. 7 is a graph of Benzene DRE, plotted in nines, unburned hydrocarbons (UHC), plotted in per cent, CO, plotted in parts per million (ppm), and $No_x$, plotted in ppm X 10, in After Burner (AB) tests as a function of central air forcing, plotted in volts (V).

The optimum performance occurs with both the central 13 and secondary 22 air forced and when the relative phase angle is important. With the improper phase angle the CO was about 180 ppm and the DRE only 3.2 nines at x/D=3. The unforced AB configuration 20 resulted in CO of 1000 ppm and UHC of 0.14% all at x/D=3. The most efficient operation of the controller dropped CO to under 3 ppm and UHC to below 0.01% and raised the DRE to 4.5 nines. The $NO_x$ for the unforced AB configuration, 20 ppm, was lower than the unforced GB configuration 10, however, the controller reduced it further to about 12 ppm. As the forcing level of the primary air was increased the DRE increased as CO and UHC dropped as illustrated 70 in FIG. 7. Benzene DRE 71, plotted in nines 71A, unburned hydrocarbons (UHC) 72, plotted in per cent 72A, carbon monoxide (CO) 73, plotted in ppm 73A, and oxides of nitrogen ($No_x$) 74, plotted in ppmX10 74A are compared as a function of central air forcing 75, plotted in volts (V). As control authority is exercised the Benzene DRE 71A increases and the CO 73A, UHC 72A, and, to some extent, $NO_x$ decrease.

The GB 20 configuration 10 reached 4 nines DRE at x/D of only 1.7 and the DRE at x/D=3 was 5.5. The initial AB configuration 20 did not have DRE performance as efficient as the GB configuration 10. The DRE reached only 4.5 nines at x/D=3, the flame appeared to be not as compact, and the acoustic levels were lower. Apparently, without direct modulation of the combustibles there is less of a periodic heat release in the chamber, and perhaps less coherent vortices, resulting in lower DREs. The decision was made to redesign the entrainment region (not separately shown) for optimum indirect modulation of the pyrolysis surrogate 23. The initial AB configuration 20 had the entrainment region flow (pyrolysis surrogate) enter at 90° to the flow. Tests indicated that that this may partially destroy the coherency of the vortex generation. The initial AB configuration did not match the GB configuration 10 in which the combustibles (fuel+409 benzene) 11 entered at 15° into the flow, and the secondary entrainment air 22 entered at 90°, but at a much lower velocity and much further from the exit dump 17.

Two modified entrainment/fuel injector plate assemblies (not shown) were designed and tested. Both were designed to increase the modulation of the pyrolysis surrogate 23 by the secondary air 22 acoustics via internal mixing, and both redirected the mixture of pyrolysis surrogate 23 and secondary air 22 flow to enter the shear layer at 15° to the flow. The differences in the entrainment/fuel injector plate assemblies were in the details of the internal mixing region. One plate assembly attempted to mimic an ejector, the other mixed internally with a 90° intersection. The latter plate assembly was found to be the most efficient and the results, as follows, reflect this assembly.

Figure 8:
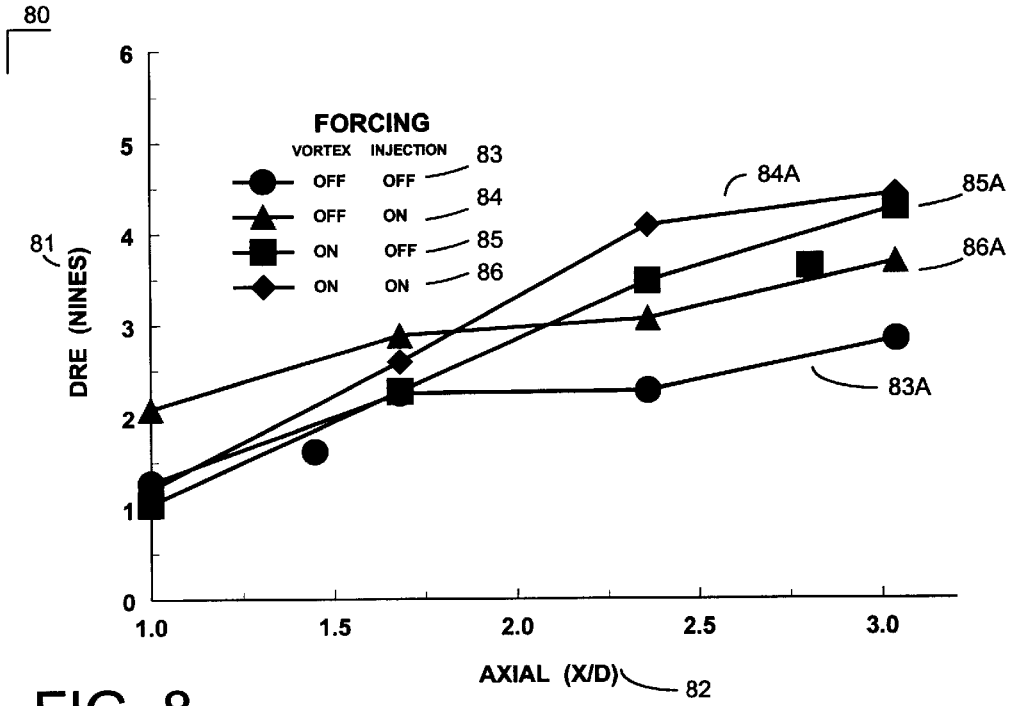
FIG. 8 is a graph of Benzene DRE, plotted in nines, in After Burner (AB) tests as a function of x/D, plotted as a ratio, for various conditions of central air forcing as determined by the controller.
Figure 9:
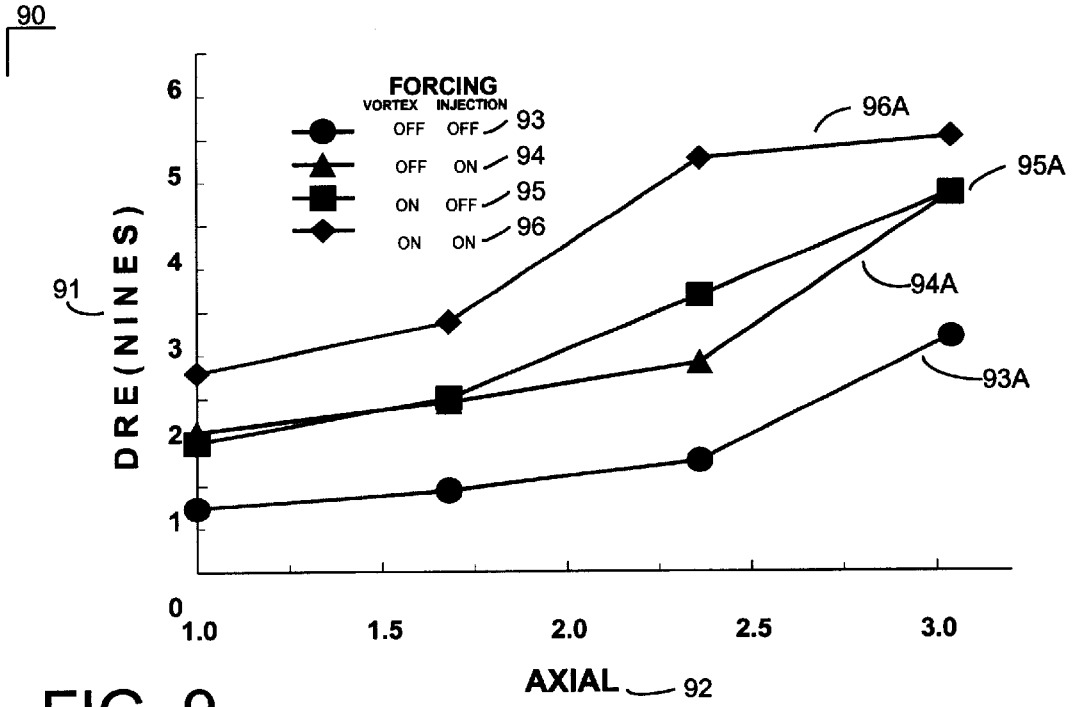
FIG. 9 depicts the same functions as FIG. 8 but for the optimized geometry AB configuration of a preferred embodiment of the present invention.

The redesigned entrainment/mixing geometry (not shown) apparently was better able to modulate the pyrolysis surrogate 23 as the chamber acoustic levels were much higher and the flame appeared shorter. FIGS. 8 and 9 illustrate that the DRE performance was enhanced as well. The original AB configuration 20 reached 4 nines only at x/D=2.32 (FIGS. 10 and 11) while the new version was somewhat more compact and reached 4 nines by x/D=2.07.

FIG. 8 illustrates 80 Benzene DRE 81, plotted as nines, versus x/D 82, as measured in the original AB configuration 20 for various conditions 83–86 of the controller. For each condition 83–86, curves 83A–86A demonstrate increased DRE as x/D increases. Curve 83A shows the performance for both vortex and secondary forcing off (least improvement with x/D); Curve 84A illustrates secondary air forcing only (best overall improvement with x/D; Curve 85A illustrates vortex forcing only (second best overall improvement with x/D); and Curve 86A illustrates both vortex and secondary forcing (performance intermediate no forcing and single element forcing). FIG. 9 illustrates 90 the same elements 91 and 92 as FIG. 8 for the optimized geometry of the AB configuration. The major difference is the increased performance when both vortex and secondary forcing are employed as seen in Curve 96A for condition 96 as compared to Curve 95A depicting the single vortex forcing condition 95 and Curve 94A depicting the single secondary forcing condition 94. All forcing conditions were superior to the condition 93 represented in Curve 93A.

Figure 10:
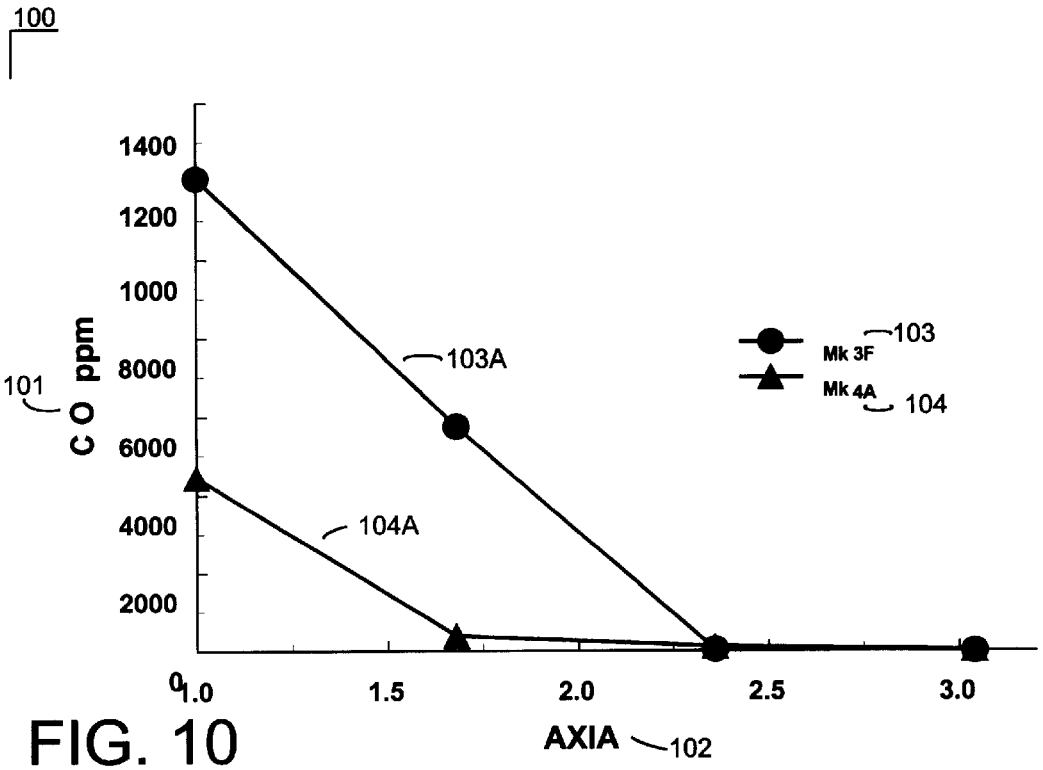
FIG. 10 compares CO, plotted in ppm, as a function of x/D for the initial AB geometry and the optimized geometry.

FIG. 10 clearly shows that the new configuration is more compact and has better performance when CO is monitored.

FIG. 10 illustrates 100 CO 101, plotted in ppm, versus x/D 102 for the initial AB configuration condition 103 in Curve 103A, and the much-improved performance of the optimized configuration condition 104 in Curve 104A. $NO_x$ levels were about 17 ppm.

Figure 11:
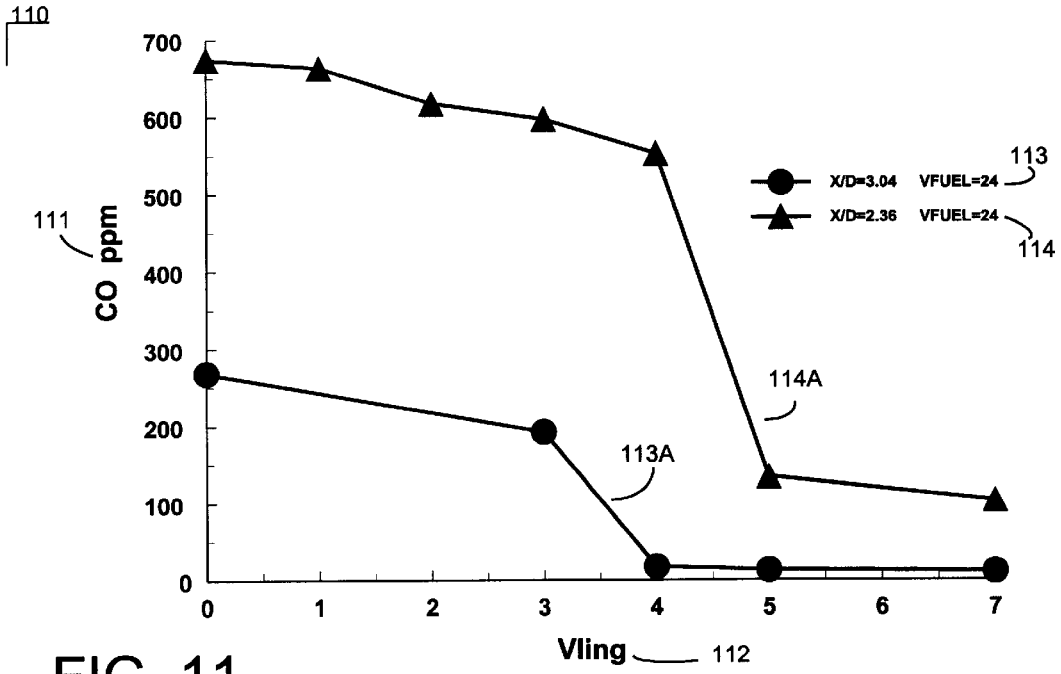
FIG. 11 compares CO, plotted in ppm, as a function of vortex forcing, plotted as Vling, for various conditions of x/D in the optimized AB geometry.
Figure 12:
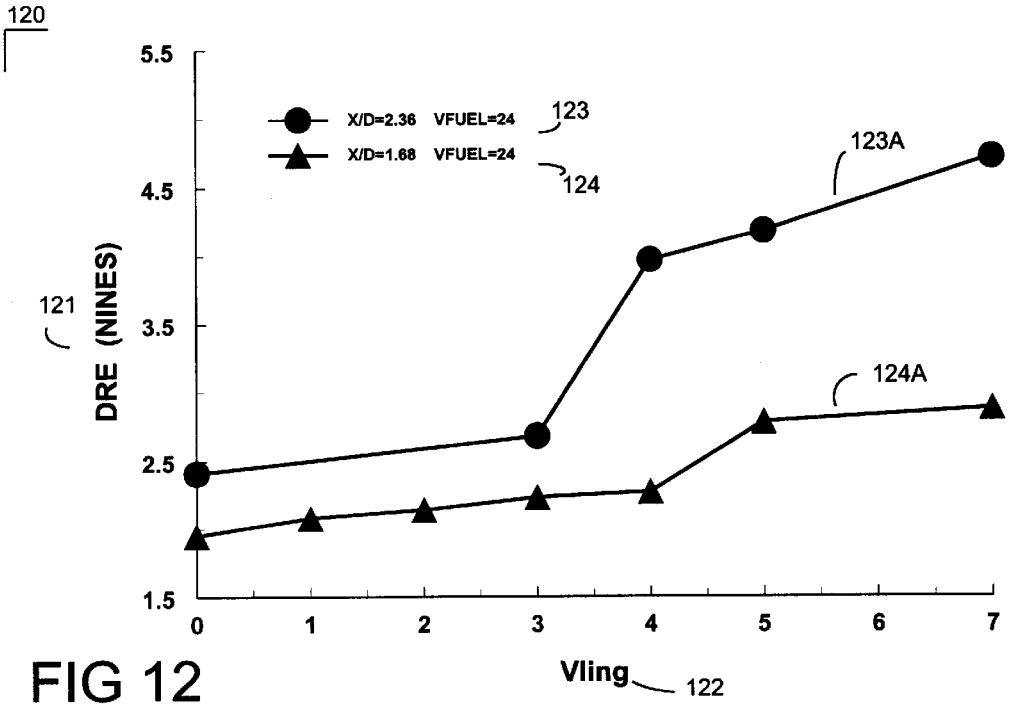
FIG. 12 compares Benzene DRE, plotted in nines, as a function of vortex forcing, plotted as Vling, for various x/D in the optimized AB geometry.
Figure 13:
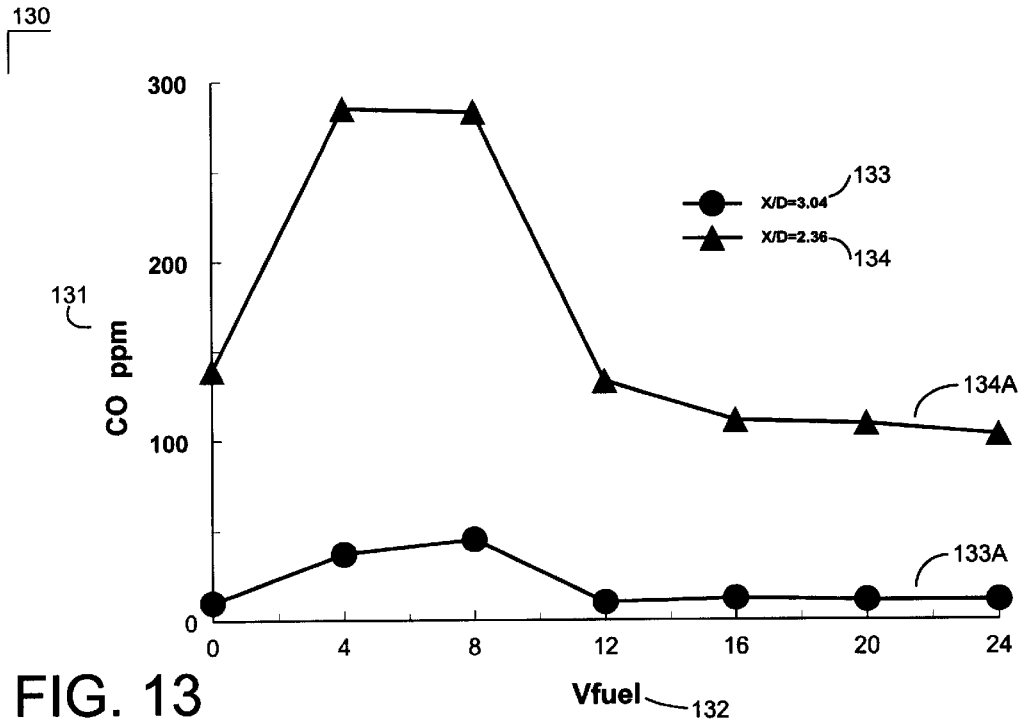
FIG. 13 compares CO, plotted in ppm, as a function of secondary forcing, plotted in $V_{rms}$ on the secondary air ports, for various x/D in the optimized AB geometry.

FIGS. 11 and 12 indicate that the primary air 13 forcing level still has the most effect on reduction of CO and increases in DRE. FIG. 13 FIG. 11 illustrates 110 CO 111, plotted in ppm, as a function of volts at the Ling™ valve 18, $V_{ling}$ 112, for two values of x/D, x/D=3 113 plotted on Curve 113A and x/D=2.36 114, plotted on Curve 114A. As seen, the greater reduction occurs at the exit represented by condition 113 on Curve 113A. FIG. 12 illustrates 120 pyrolysis surrogate DRE 121, plotted in nines, as a function of volts at the Ling™ valve 18, $V_{ling}$ 122 for two values of x/D, x/D=2.36 123 plotted on Curve 123A and x/D=1.68 124, plotted on Curve 124A. As seen, the greater reduction occurs at the further axial location represented by conditions 123 on Curve 123A. Graph 11 illustrates that the secondary air 22 forcing effect is not as dramatic.

FIG. 13 illustrates 130, for the optimized AB configuration, CO 131, plotted as ppm, versus vortex forcing voltage ($V_{rms}$ on the secondary air ports), $V_{fuel}$ 132, for two values of x/D, condition 133 plotted as curve 133A and condition 134 plotted as curve 134A. As can be seen CO levels are considerably reduced in curve 134A representing the axial location at the exit 19A. However, FIG. 14 shows that the DRE is still significantly increased when increasing the secondary air 22 forcing level.

Figure 14:
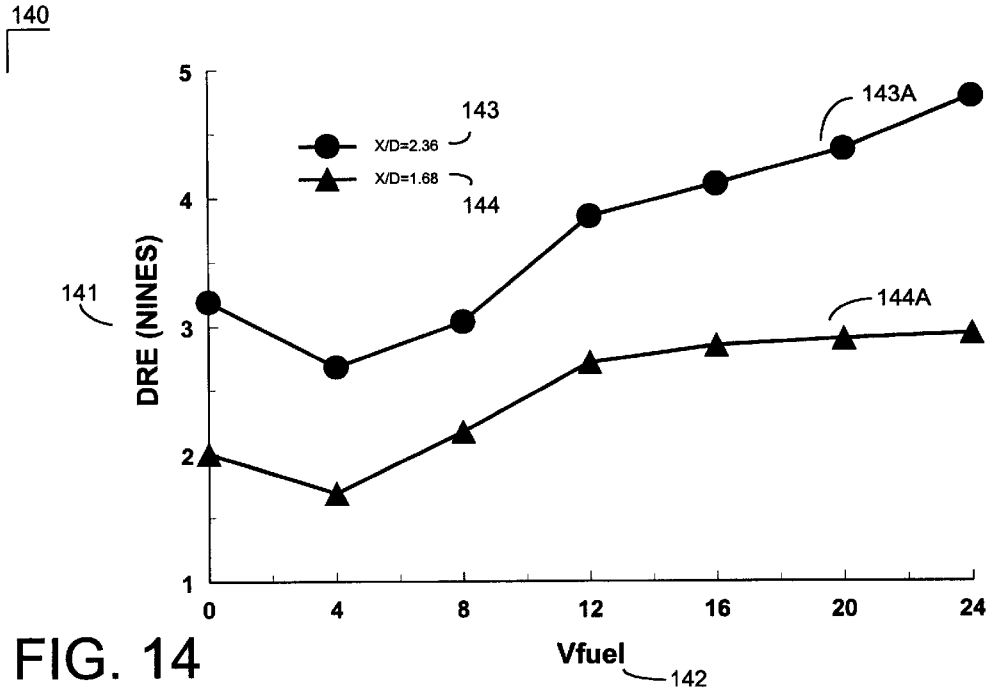
FIG. 14 compares Benzene DRE, plotted in nines, as a function of secondary forcing, $V_{fuel}$, plotted in $V_{rms}$ on the secondary air ports, for various x/D in the optimized AB geometry.

FIG. 14 illustrates 140, for the optimized AB configuration Benzene DRE 141, plotted as nines, versus vortex forcing voltage ($V_{rms}$ on the secondary air ports), $V_{fuel}$ 142, for two values of x/D, condition 143 plotted as curve 143A and condition 144 plotted as curve 144A. As can be seen pyrolysis surrogate levels are considerably reduced in curve 143A representing the axial location closer to the exit 19A. This indicates that the new configuration better modulates the pyrolysis surrogate 23.

In conclusion, past technologies resulted in the direct modulation of the fuel and the waste. In these technologies acoustic drivers modulate the waste injection directly. In this invention the pyrolysis surrogate 23 is modulated by periodic entrainment created by roll-up of the main air vortex as well as acoustic excitation of secondary air 22 injection. In both configurations 10 and 20, the phase angle is controlled such that the combustibles are introduced into the air vortex 12 at the right time during the vortex formation. This leads to good mixing, a controlled yet partially premixed flame, high waste destruction efficiency and low pollutant emissions. The main advantage in this new configuration is that the acoustic drivers 14 used to phase inject the waste into the vortex 12 for proper combustion are not in direct contact with the hot waste.

Since various changes and modifications can be made in the invention without departing from the spirit of the invention, the invention is not to be taken as limited except by the scope of the appended claims.

What is claimed is:

1. A method for actively controlling a combustion process comprising the steps of:

producing a series of discrete, coherent large scale vortices in a combustion chamber with a vortex generating means;

injecting a fuel supply proximate the vortices with an indirect acoustic/fluid dynamic fuel modulator, said fuel modulator adapted for inducing the pulsed injection of said fuel into said vortices at designated locations relative to the formation of said vortices within said combustion chamber thereby affecting the mixing of said fuel with an oxidizer, the efficiency of the burning, and the amount of undesirable combustion by-products formed during the combustion process; and controlling the timing and location of the pulsed fuel injection relative to the formation of said vortices within the combustion chamber with a controller device, said controller device being operatively connected to said vortex generating means and said fuel modulator in order to synchronize and actively control the phase shift between the formation of the large scale vortices and the pulsed injection of said fuel in response to predetermined inputs.

* * * * *